United States Patent
Chen et al.

(10) Patent No.: US 12,541,893 B2
(45) Date of Patent: Feb. 3, 2026

(54) BI-PLANE AND THREE-DIMENSIONAL ULTRASOUND IMAGE ACQUISITION FOR GENERATING ROADMAP IMAGES, AND ASSOCIATED SYSTEMS AND DEVICES

(71) Applicant: KONINKLIJKE PHILIPS N.V., Eindhoven (NL)

(72) Inventors: Alvin Chen, Cambridge, MA (US); Mingxin Zheng, Cambridge, MA (US); Ramon Quido Erkamp, Swampscott, MA (US); Ameet Kumar Jain, Boston, MA (US); Sibo Li, Waltham, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 544 days.

(21) Appl. No.: 17/918,166

(22) PCT Filed: Apr. 12, 2021

(86) PCT No.: PCT/EP2021/059363
§ 371 (c)(1),
(2) Date: Oct. 11, 2022

(87) PCT Pub. No.: WO2021/209348
PCT Pub. Date: Oct. 21, 2021

(65) Prior Publication Data
US 2023/0127935 A1 Apr. 27, 2023

Related U.S. Application Data

(60) Provisional application No. 63/010,927, filed on Apr. 16, 2020.

(51) Int. Cl.
 *G06T 11/60* (2006.01)
 *A61B 8/00* (2006.01)
 (Continued)

(52) U.S. Cl.
 CPC .............. *G06T 11/60* (2013.01); *A61B 8/145* (2013.01); *A61B 8/463* (2013.01); *A61B 8/5253* (2013.01);
 (Continued)

(58) Field of Classification Search
 CPC ....... A61B 8/145; A61B 8/4245; A61B 8/463; A61B 8/466; A61B 8/483; A61B 8/5238;
 (Continued)

(56) References Cited

U.S. PATENT DOCUMENTS

| 4,173,007 A | 10/1979 | McKeighen et al. |
| 6,468,216 B1 | 10/2002 | Powers et al. |

(Continued)

FOREIGN PATENT DOCUMENTS

| JP | 2001104312 A | 4/2001 |
| WO | 2019121127 A1 | 6/2019 |
| WO | 2021089810 A1 | 5/2021 |

OTHER PUBLICATIONS

Hossack, John A., et al. "Quantitative 3-D diagnostic ultrasound imaging using a modified transducer array and an automated image tracking technique." IEEE transactions on ultrasonics, ferroelectrics, and frequency control 49.8 (2002): 1029-1038. (Year: 2002).*

(Continued)

*Primary Examiner* — Chineyere Wills-Burns
*Assistant Examiner* — Emmanuel Silva-Avina

(57) ABSTRACT

Disclosed is an ultrasound roadmap image generation system. The system includes a processor configured for communication with an ultrasound imaging device that is movable relative to a patient. The processor receives a first bi-plane or 3D image representative of a first volume within the patient and a second bi-plane or 3D image representative of a second volume within the patient. The processor then (Continued)

registers the first bi-plane or 3D image and the second bi-plane or 3D image to determine the motion between the first bi-plane or 3D image and the second bi-plane or 3D image. The processor then generates a 2D roadmap image of a region of interest by combining the first bi-plane or 3D image and the second bi-plane or 3D image, based on the determined motion; and outputs a screen display comprising the 2D roadmap image.

8 Claims, 12 Drawing Sheets

(51) Int. Cl.
 *A61B 8/14* (2006.01)
 *G06T 7/20* (2017.01)
 *G06T 7/33* (2017.01)
(52) U.S. Cl.
 CPC .............. *G06T 7/20* (2013.01); *G06T 7/33* (2017.01); *G06T 2207/10136* (2013.01); *G06T 2207/30101* (2013.01)
(58) Field of Classification Search
 CPC .......... A61B 8/5253; A61B 8/5246; G06T 2207/10136; G06T 2207/20221; G06T 2207/30101; G06T 7/20; G06T 7/246; G06T 7/248; G06T 7/33; G06T 7/337
 USPC ............................................. 382/131
 See application file for complete search history.

(56) References Cited

U.S. PATENT DOCUMENTS

| | | | |
|---|---|---|---|
| 6,582,367 B1 | 6/2003 | Robinson et al. | |
| 2007/0255137 A1* | 11/2007 | Sui .................. | G01S 15/8993 600/443 |
| 2009/0198134 A1 | 8/2009 | Hashimoto et al. | |
| 2011/0079082 A1* | 4/2011 | Yoo .................. | A61B 8/483 73/632 |
| 2016/0007970 A1 | 1/2016 | Dufour et al. | |
| 2022/0167947 A1* | 6/2022 | Seth ................. | G06N 20/00 |

OTHER PUBLICATIONS

International Search Report and Written Opinion for PCT/EP2021/059363; Mailing date: Jul. 19, 2021, 9 pages.
Xiong, Y. et al., "Real-time three-dimensional ultrasound with Live xPlane imaging assists first-trimester acquisition of a true midsagittal section", Ultrasound Obstet Gynecol, 2010, vol. 36, pp. 136-140.
McGhie, J.S., et al., "Contributions of Simultaneous Multiplane Echocardiographic Imaging in Daily Clinical Practice", Echocardiography 2014, vol. 31, 245-254.
Vegas, A. et al., "Core review: three-dimensional transesophageal echocardiography is a major advance for intraoperative clinical management of patients undergoing cardiac surgery: a core review", Anesth Analg., 2010, vol. 110, pp. 1548-1573.

* cited by examiner

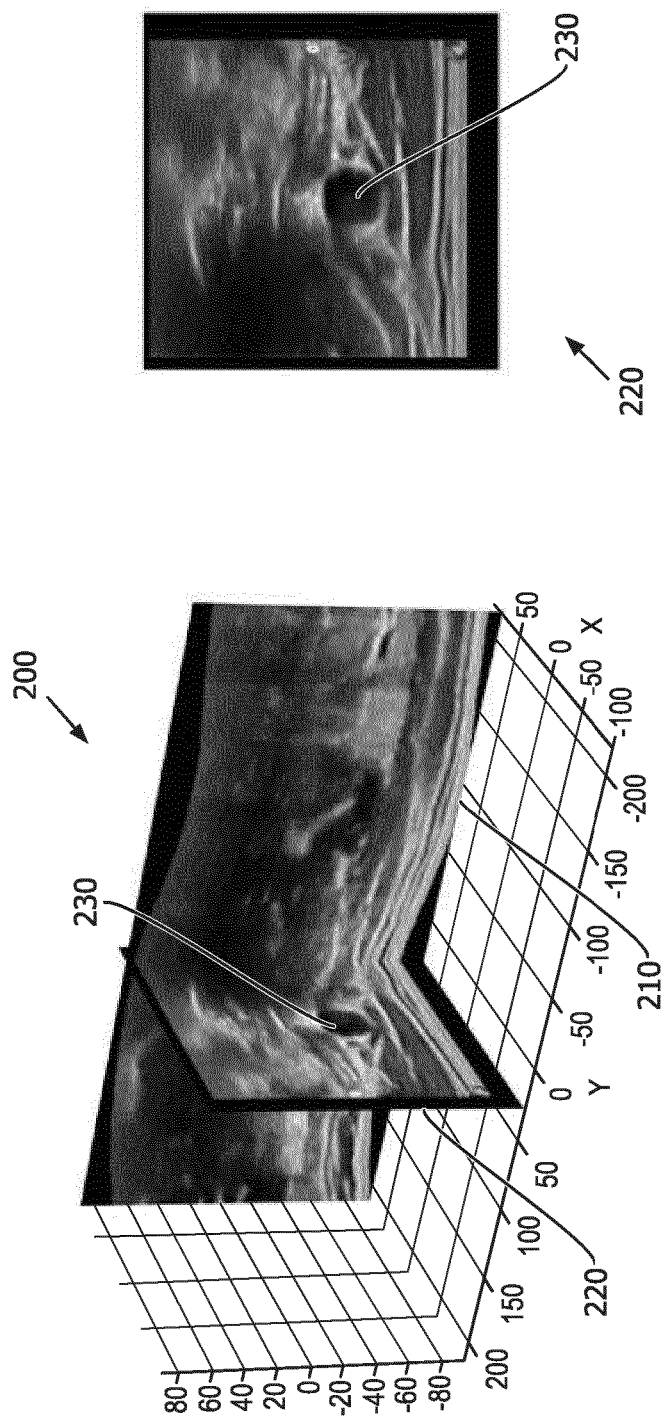

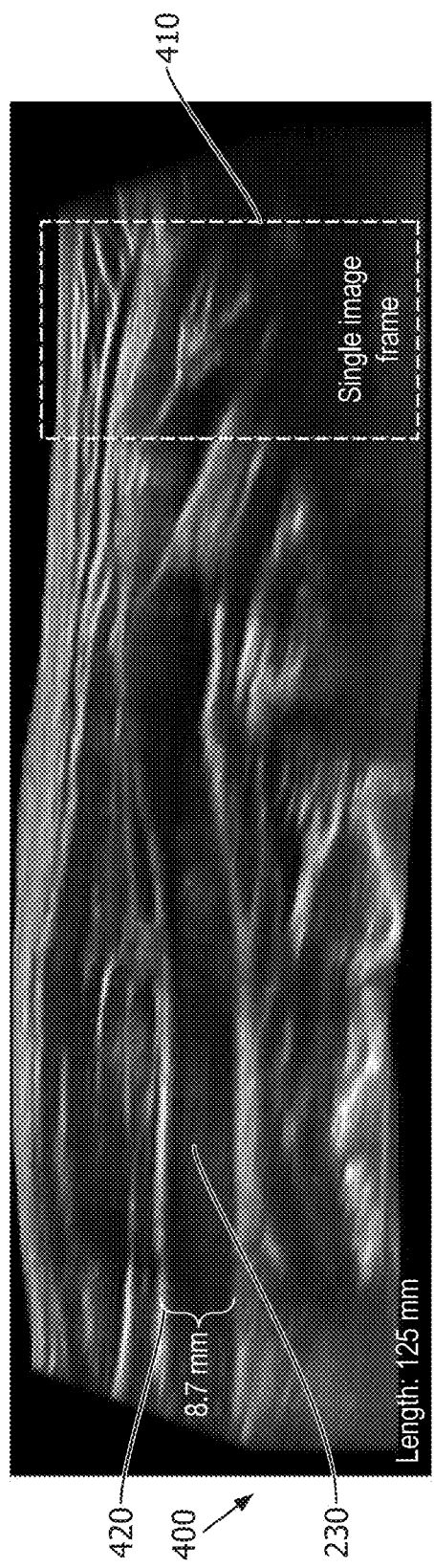
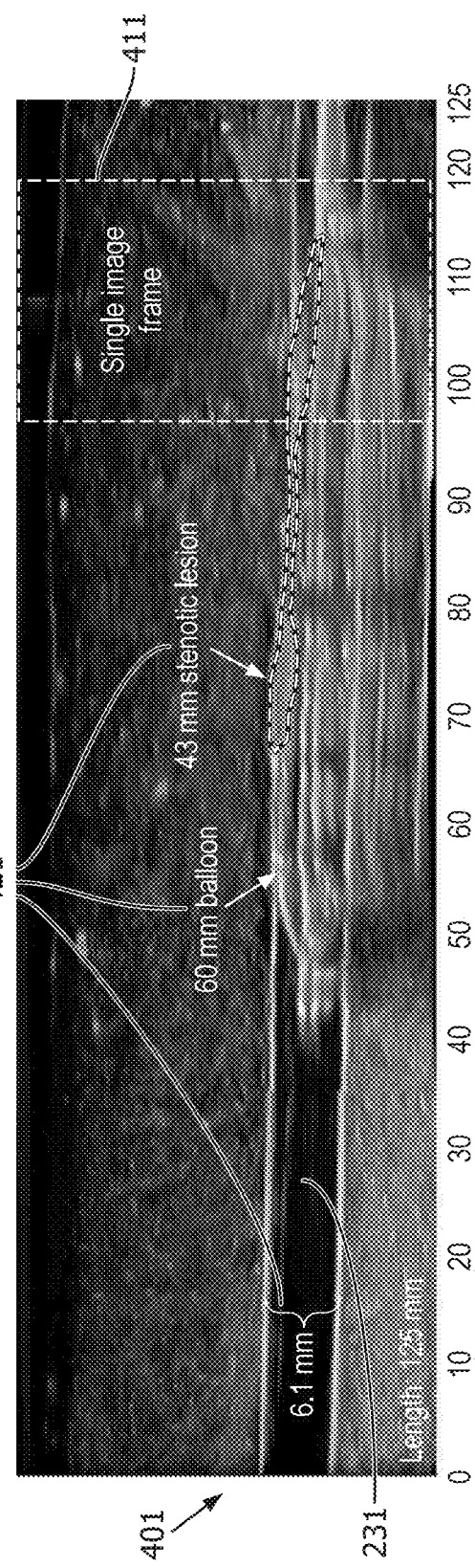
FIG. 4B
FIG. 4A

BI-PLANE AND THREE-DIMENSIONAL ULTRASOUND IMAGE ACQUISITION FOR GENERATING ROADMAP IMAGES, AND ASSOCIATED SYSTEMS AND DEVICES

CROSS-REFERENCE TO PRIOR APPLICATIONS

This application is the U.S. National Phase application under 35 U.S.C. § 371 of International Application No. PCT/EP2021/059363, filed on Apr. 12, 2021, which claims the benefit of U.S. Provisional Patent Application No. 63/010,927, filed on Apr. 16, 2020. These applications are hereby incorporated by reference herein.

TECHNICAL FIELD

The subject matter described herein relates generally to the acquisition and display of ultrasound images. In particular, the present disclosure describes systems and methods for generating panoramic ultrasound images. The described devices, systems, and methods have particular but not exclusive utility for diagnostic medical imaging.

BACKGROUND

Ultrasound imaging is frequently used to obtain images of internal anatomical structures of a patient. Ultrasound systems typically comprise an ultrasound transducer probe that includes a transducer array coupled to a probe housing. The transducer array is activated to vibrate at ultrasonic frequencies to transmit ultrasonic energy into the patient's anatomy, and then receive ultrasonic echoes reflected or backscattered by the patient's anatomy to create an image. Such transducer arrays may include various layers, including some with piezoelectric materials, which vibrate in response to an applied voltage to produce the desired pressure waves. These transducers may be used to successively transmit and receive several ultrasonic pressure waves through the various tissues of the body. The various ultrasonic responses may be further processed by an ultrasonic imaging system to display the various structures and tissues of the body.

Ultrasound imaging may be limited by a small field-of-view, particularly in comparison to other imaging modalities such as X-ray, CT, and MRI. The limited field-of-view can result in difficult workflows, increased procedure times, and reduced clinical efficacy. One way to synthesize extended ultrasound images from limited individual frames is by stitching the frames together to create panoramic "roadmap" images that reduce the reliance on mental imagery and memory to visualize features outside the current field of view.

There may be challenges associated with roadmap image creation in ultrasound. For example, random speckle and noise present in ultrasound images can make roadmap creation prone to uncertainty and errors. Second, because roadmap images often rely on a series of ultrasound images taken while a sonographer is manually moving the ultrasound probe across the anatomy of the patient, it can be challenging to determine whether sequential ultrasound images are in-plane with one another. In that regard, the movement of the ultrasound probe may not follow a linear path, and the planes of the sequential images may not be parallel to one another. If consecutive two-dimensional (2D) frames are not in-plane with each other, the number of salient image features between frames may be limited, resulting in poor frame-to-frame registration accuracy.

Thus, despite significant interest in the use of image-based registration techniques for 2D ultrasound frame-to-frame alignment to create extended views, clinical and commercial translation of these techniques has been limited.

The information included in this Background section of the specification, including any references cited herein and any description or discussion thereof, is included for technical reference purposes only and is not to be regarded as subject matter by which the scope of the disclosure is to be bound.

SUMMARY

Disclosed is a novel image acquisition system and method that includes using multiple bi-plane and/or 3D ultrasound images to construct extended field-of-view panoramic roadmaps. The use of bi-plane and/or 3D ultrasound imaging can significantly improve roadmapping accuracy compared to traditional 2D image-based methods, because unlike 2D images, these image types contain information that can be used to determine the relative poses (e.g., ultrasound scanner position and orientation) for each image, and thus allow for improved landmark registration. Multiple images can thus be translated and/or rotated into a common coordinate system, assembled, and smoothed to form a panoramic roadmap image covering a larger region of the patient's anatomy than would be possible with a single image. This system may be hereinafter referred to as an ultrasound roadmap generation system.

The ultrasound roadmap generation system disclosed herein has particular, but not exclusive, utility for diagnostic medical imaging. According to an embodiment of the present disclosure, an ultrasound roadmap generation system includes a processor circuit configured for communication with an ultrasound imaging device movable relative to a patient, where the processor circuit is configured to: receive a first bi-plane or 3D image representative of a first volume within the patient and a second bi-plane or 3D image representative of a second volume within the patient; register the first bi-plane or 3D image and the second bi-plane or 3D image to determine a first motion between the first bi-plane or 3D image and the second bi-plane or 3D image; generate a 2D roadmap image of a region of interest by combining the first bi-plane or 3D image and the second bi-plane or 3D image, based on the determined first motion; and output, to a display in communication with the processor circuit, a screen display including the 2D roadmap image. Other embodiments of this aspect include corresponding computer systems, apparatus, and computer programs recorded on one or more computer storage devices, each configured to perform the actions of the methods.

In some embodiments, the processor circuit is configured to combine the first bi-plane or 3D image and the second bi-plane or 3D image by transforming the first bi-plane or 3D image relative to the second bi-plane or 3D image such that the first bi-plane or 3D image and the second bi-plane or 3D image are in a same coordinate system. The processor circuit may be configured to: identify an image landmark in each of the first bi-plane or 3D image and the second bi-plane or 3D image; and combine the first bi-plane or 3D image and the second bi-plane or 3D image by transforming, based on the determined first motion, at least one of the first bi-plane or 3D image or the second bi-plane or 3D image such that the image landmark in the first bi-plane or 3D image is aligned with the image landmark in the second bi-plane or 3D image. The processor circuit may be further configured to: receive a third bi-plane or 3D image representative of a third volume within the patient; register the third bi-plane or 3D image to at least one of the first bi-plane or 3D image or the second bi-plane or 3D image to determine a second motion between the third bi-plane or 3D image and the at least one of the first bi-plane or 3D image or the second bi-plane or 3D image; and generate the 2D roadmap image of a region of interest by combining the first, second, and third bi-plane or 3D images, based on the determined first motion and second motion. Two images of the first, second, and third bi-plane or 3D images may be 3D images, where one image of the first, second, and third bi-plane or 3D images is a bi-plane image, and where the processor circuit is configured to: register the two 3D images to each other; register the bi-plane image to a nearest 3D image of the two 3D images; extract image data from the bi-plane image; and generate the 2D roadmap image based on the extracted image data. The 3D images may have lower resolution than the bi-plane images. Each of the three bi-plane or 3D images may be a 3D image. Each of the three bi-plane or 3D images may be a bi-plane image. The processor circuit may be configured to determine the first motion by detecting out-of-plane translation or rotation between neighboring bi-plane images using speckle-based decorrelation. Implementations of the described techniques may include hardware, a method or process, or computer software on a computer-accessible medium.

According to another embodiment, a method includes receiving, at a processor circuit configured for communication with an ultrasound imaging device movable relative to a patient, a first bi-plane or 3D image of a first volume within the patient and a second bi-plane or 3D image of a second, overlapping volume within the patient; registering the first bi-plane or 3D image and the second bi-plane or 3D image to determine a first motion between the first bi-plane or 3D image and the second bi-plane or 3D image; generating, with the processor circuit, a 2D roadmap image of a region of interest by combining the first bi-plane or 3D image and the second bi-plane or 3D image, based on the determined first motion; and outputting, to a display in communication with the processor circuit, a screen display including the 2D roadmap image. Other embodiments of this aspect include corresponding computer systems, apparatus, and computer programs recorded on one or more computer storage devices, each configured to perform the actions of the methods.

In some embodiments, the roadmap image may include transforming the first bi-plane or 3D image relative to the second bi-plane or 3D image such that the first bi-plane or 3D image and the second bi-plane or 3D image are in a same coordinate system. Generating the roadmap image may include: identifying an image landmark that is common to the first bi-plane or 3D image and the bi-plane or 3D image; and combining the first bi-plane or 3D image and the second bi-plane or 3D image by transforming, based on the determined first motion, at least one of the first bi-plane or 3D image or the second bi-plane or 3D image such that the image landmark in the first bi-plane or 3D image is aligned with the image landmark in the second bi-plane or 3D image. The method may further include: receiving at a third bi-plane or 3D image representative of a third volume within the patient; registering the third bi-plane or 3D image to at least one of the first bi-plane or 3D image or the second bi-plane or 3D image to determine a second motion between the third bi-plane or 3D image and the at least one of the first bi-plane or 3D image or the second bi-plane or 3D image; and generating the 2D roadmap image of the region of interest by combining the first, second, and third bi-plane or 3D images, based on the determined first motion and second motion. Two images of the first, second, and third bi-plane or 3D images may be 3D images, where one image of the first, second, and third bi-plane or 3D images is a bi-plane image, and where the method further includes: registering the two 3D images to each other; registering the bi-plane image to a nearest 3D image of the two 3D images; extracting image data from the bi-plane image; and generating the 2D roadmap image based on the extracted image data. The bi-plane images may have higher resolution than the 3D images. Each of the three bi-plane or 3D images may be a 3D image. Each of the three bi-plane or 3D images may be a bi-plane image. Combining the three bi-plane images may involve detecting out-of-plane translation or rotation between neighboring bi-plane images using speckle-based decorrelation. Implementations of the described techniques may include hardware, a method or process, or computer software on a computer-accessible medium.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the ultrasound roadmap generation system, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which:

FIG. 2A shows a biplane ultrasound image of tissue surrounding a blood vessel, in accordance with aspects of the present disclosure.

FIG. 2B shows a cross-sectional plane of the bi-plane image of FIG. 2A, according to aspects of the present disclosure.

FIG. 4A shows a first composite longitudinal view of the tissue surrounding a first blood vessel, according to aspects of the present disclosure.

FIG. 4B shows a second composite longitudinal view of the tissue surrounding second blood vessel, according to aspects of the present disclosure.

DETAILED DESCRIPTION

Figure 1:
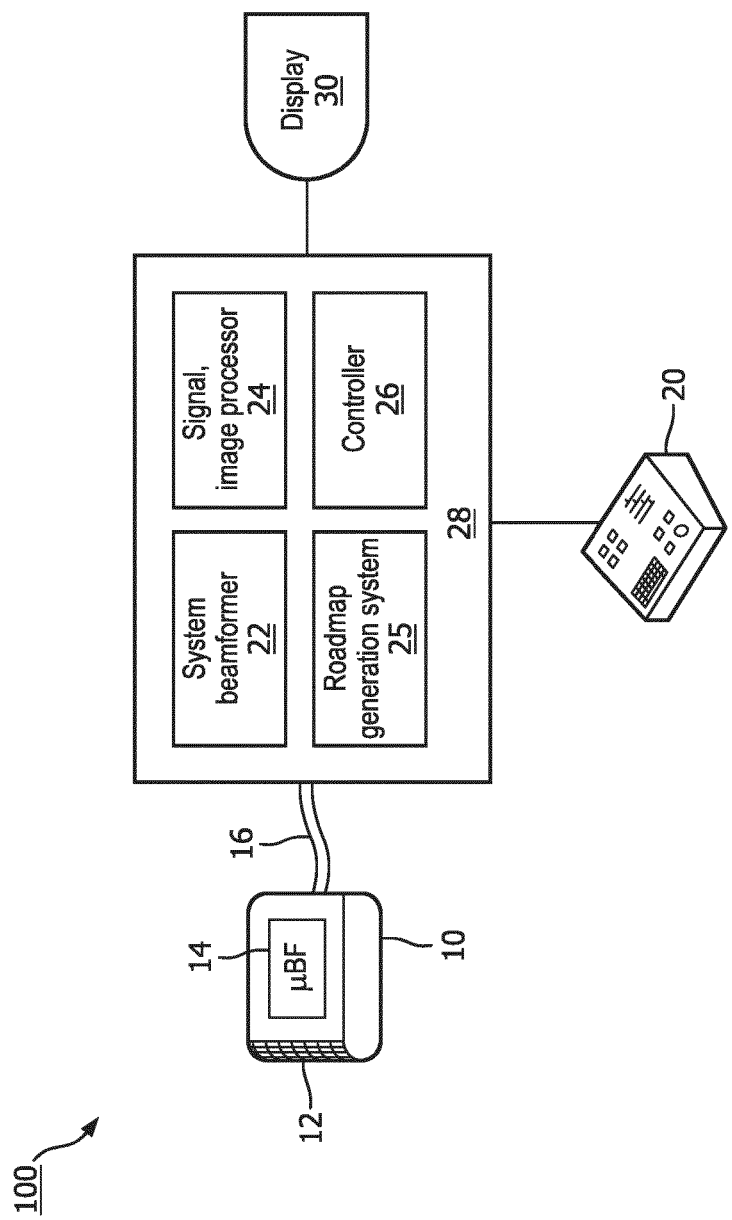
FIG. 1 is a block diagram of an example ultrasound system, according to aspects of the present disclosure.

As mentioned above, the limited field of view of ultrasound images can result in difficult workflows, increased procedure times, and reduced clinical efficacy. This disclosure describes novel devices, systems, and methods for generating roadmap images by leveraging information provided from multiplanar images (e.g., bi-plane or 3D imaging). In some aspects, the present disclosure describes methods that use bi-plane and 3D imaging in combination to create a roadmap. In that regard, external tracking systems or sensors are often not available in an ultrasound imaging system, and the roadmaps are generated using image processing of ultrasound images. However, roadmap imaging workflows may be improved if pose (ultrasound transducer position and orientation at the time of image capture) information is available for the individual images from which the roadmap image is constructed.

In accordance with at least one embodiment of the present disclosure, an ultrasound roadmap generation system is provided which combines multiple bi-plane and/or 3D ultrasound images into a single roadmap image that is representative of a wider or larger field of view than any one of the individual ultrasound images used to create the roadmap. The use of bi-plane and/or 3D ultrasound imaging can significantly improve the accuracy of roadmap stitching compared to approaches that use only single plane, 2D images, because bi-plane and 3D ultrasound images contain multiplanar information that can be used to determine the relative poses (e.g., ultrasound scanner position and orientation) for each image, and thus allow for improved landmark registration from one image to the next, even when there are variations in pose (whether accidental or deliberate) as the successive images are captured. Multiple images can thus be translated and/or rotated into a common coordinate system, assembled, joined, and smoothed to form a panoramic roadmap image that accurately represents the patient's anatomy, and that covers a larger region of the patient's anatomy than would be possible with a single image. This system is hereinafter referred to as an ultrasound roadmap generation system.

Aspects of the present disclosure include: (1) a workflow that involves sweeping an ultrasound probe over an extended area, with continuous or incremental probe motions, to create an extended field-of-view 3D image, (2) a hardware configuration in which a matrix probe is used for the sweep, and (3) image acquisition modes that utilize bi-plane imaging, 3D imaging, or the combination of bi-plane and 3D imaging. The ultrasound roadmap generation system of the present disclosure has the potential to improve the accuracy of ultrasound roadmapping technology. The ultrasound roadmap generation system may be applied to any ultrasound imaging type, including external ultrasound, intracatheter or intravascular ultrasound, and transesophageal echo, to improve the accuracy of roadmapping.

The present disclosure aids substantially in acquiring and interpreting diagnostic ultrasound images, by improving the speed, accuracy, and confidence with which panoramic roadmap images may be assembled. Implemented on a computing system in communication with an ultrasound imaging probe, the ultrasound roadmap generation system disclosed herein provides practical improvement in the quality and accuracy of ultrasound roadmap images, as well as reducing the amount of user effort involved to construct and employ roadmap images. This improved workflow transforms a piecemeal process into a fully automated roadmapping system, without relying on memory and mental imagery alone to visualize anatomical features outside the ultrasound scanner's current field of view, or interpret image artifacts and other inaccuracies in current 2D roadmaps. In addition, the 3D ultrasound roadmap generated by the system can be integrated into a clinical report and visualized to a clinician for disease diagnosis and treatment planning. This unconventional approach improves the functioning of the ultrasound imaging system, by providing accurate roadmap images automatically, during the course of routine imaging.

The ultrasound roadmap generation system may be implemented as an ultrasound image combiner viewable on a display, and operated by a control process executing on a processor that accepts user inputs from a keyboard, mouse, or touchscreen interface, and that is in communication with one or more ultrasound imaging probes or imaging arrays. In that regard, the control process performs certain specific operations in response to different inputs, selections, or probe movements made at different times.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 shows a block diagram of an example ultrasound system 100 according to aspects of the present disclosure. An ultrasound probe 10 has a transducer array 12 comprising a plurality of ultrasound transducer elements or acoustic elements. In some instances, the array 12 may include any number of acoustic elements. For example, the array 12 can include between 1 acoustic element and 100,000 acoustic elements, including values such as 2 acoustic elements, 4 acoustic elements, 36 acoustic elements, 64 acoustic elements, 128 acoustic elements, 300 acoustic elements, 812 acoustic elements, 3000 acoustic elements, 9000 acoustic elements, 30,000 acoustic elements, 65,000 acoustic elements, and/or other values both larger and smaller. In some instances, the acoustic elements of the array 12 may be arranged in any suitable configuration, such as a linear array, a planar array, a curved array, a curvilinear array, a circumferential array, an annular array, a phased array, a matrix array, a one-dimensional (1D) array, a 1.X dimensional array (e.g., a 1.5D array), or a two-dimensional (2D) array. The array of acoustic elements (e.g., one or more rows, one or more columns, and/or one or more orientations) can be uniformly or independently controlled and activated. The array 12 can be configured to obtain one-dimensional, two-dimensional, bi-plane, and/or three-dimensional images of patient anatomy.

Although the present disclosure refers to synthetic aperture external ultrasound imaging using an external ultrasound probe, it will be understood that one or more aspects of the present disclosure can be implemented in any suitable ultrasound imaging probe or system, including external ultrasound probes and intraluminal ultrasound probes. For example, aspects of the present disclosure can be implemented in ultrasound imaging systems using a mechanically-scanned external ultrasound imaging probe, an intracardiac (ICE) echocardiography catheter and/or a transesophageal echocardiography (TEE) probe, a rotational intravascular ultrasound (IVUS) imaging catheter, a phased-array IVUS imaging catheter, a transthoracic echocardiography (TTE) imaging device, or any other suitable type of ultrasound imaging device.

Figure 10:
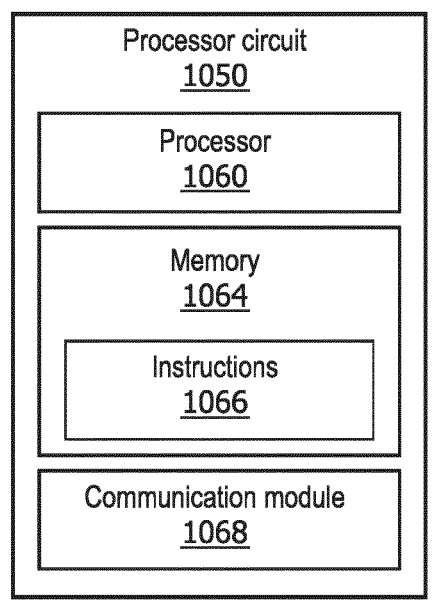
FIG. 10 is a schematic diagram of a processor circuit, according to aspects of the present disclosure.

Referring again to FIG. 1, the acoustic elements of the array 12 may comprise one or more piezoelectric/piezoresistive elements, lead zirconate titanate (PZT), piezoelectric micromachined ultrasound transducer (PMUT) elements, capacitive micromachined ultrasound transducer (CMUT) elements, and/or any other suitable type of acoustic elements. The one or more acoustic elements of the array 12 are in communication with (e.g., electrically coupled to) electronic circuitry 14. In some embodiments, such as the embodiment of FIG. 1, the electronic circuitry 14 can comprise a microbeamformer (uBF). In other embodiments, the electronic circuitry comprises a multiplexer circuit (MUX). The electronic circuitry 14 is located in the probe 10 and communicatively coupled to the transducer array 12. In some embodiments, one or more components of the electronic circuitry 14 can be positioned in the probe 10. In some embodiments, one or more components of the electronic circuitry 14, can be positioned in a computing device or processing system 28. The computing device 28 may be or include a processor, such as one or more processors in communication with a memory. As described further below, the computing device 28 may include a processor circuit as illustrated in FIG. 10. In some aspects, some components of the electronic circuitry 14 are positioned in the probe 10 and other components of the electronic circuitry 14 are positioned in the computing device 28. The electronic circuitry 14 may comprise one or more electrical switches, transistors, programmable logic devices, or other electronic components configured to combine and/or continuously switch between a plurality of inputs to transmit signals from each of the plurality of inputs across one or more common communication channels. The electronic circuitry 14 may be coupled to elements of the array 12 by a plurality of communication channels. The electronic circuitry 14 is coupled to a cable 16, which transmits signals including ultrasound imaging data to the computing device 28.

In the computing device 28, the signals are digitized and coupled to channels of a system beamformer 22, which appropriately delays each signal. The delayed signals are then combined to form a coherent steered and focused receive beam. System beamformers may comprise electronic hardware components, hardware controlled by software, or a microprocessor executing beamforming algorithms. In that regard, the beamformer 22 may be referenced as electronic circuitry. In some embodiments, the beamformer 22 can be a system beamformer, such as the system beamformer 22 of FIG. 1, or it may be a beamformer implemented by circuitry within the ultrasound probe 10. In some embodiments, the system beamformer 22 works in conjunction with a microbeamformer (e.g., electronic circuitry 14) disposed within the probe 10. The beamformer 22 can be an analog beamformer in some embodiments, or a digital beamformer in some embodiments. In the case of a digital beamformer, the system includes A/D converters which convert analog signals from the array 12 into sampled digital echo data. The beamformer 22 generally will include one or more microprocessors, shift registers, and or digital or analog memories to process the echo data into coherent echo signal data. Delays are effected by various means such as by the time of sampling of received signals, the write/read interval of data temporarily stored in memory, or by the length or clock rate of a shift register as described for example in U.S. Pat. No. 4,173,007 to McKeighen et al., the entirety of which is hereby incorporated by reference herein. Additionally, in some embodiments, the beamformer can apply appropriate weight to each of the signals generated by the array 12. The beamformed signals from the image field are processed by a signal and image processor 24 to produce 2D or 3D images for display on an image display 30. The signal and image processor 24 may comprise electronic hardware components, hardware controlled by software, or a microprocessor executing image processing algorithms. It generally will also include specialized hardware or software which processes received echo data into image data for images of a desired display format such as a scan converter. In some embodiments, beamforming functions can be divided between different beamforming components. For example, in some embodiments, the system 100 can include a microbeamformer located within the probe 10 and in communication with the system beamformer 22. The microbeamformer may perform preliminary beamforming and/or signal processing that can reduce the number of communication channels used to transmit the receive signals to the computing device 28.

Control of ultrasound system parameters such as scanning mode (e.g., B-mode, M-mode), probe selection, beam steering and focusing, and signal and image processing is done under control of a system controller 26 which is coupled to various modules of the system 100. The system controller 26 may be formed by application specific integrated circuits (ASICs) or microprocessor circuitry and software data storage devices such as RAMs, ROMs, or disk drives. In the case of the probe 10, some of this control information may be provided to the electronic circuitry 14 from the computing device 28 over the cable 16, conditioning the electronic circuitry 14 for operation of the array according to the particular scanning procedure. The user inputs these operating parameters by means of a user interface device 20.

In some embodiments, the image processor 24 is configured to generate images of different modes to be further analyzed or output to the display 30. For example, in some embodiments, the image processor can be configured to compile a B-mode image, such as a live B-mode image, of an anatomy of the patient. In other embodiments, the image processor 24 is configured to generate or compile an M-mode image. An M-mode image can be described as an image showing temporal changes in the imaged anatomy along a single scan line.

It will be understood that the computing device 28 may comprise hardware circuitry, such as a computer processor, application-specific integrated circuit (ASIC), field-programmable gate array (FPGA), capacitors, resistors, and/or other electronic devices, software, or a combination of hardware and software. In some embodiments, the computing device 28 is a single computing device. In other embodiments, the computing device 28 comprises separate computer devices in communication with one another.

The computing device 28 may further include a roadmap generation system 25, which is used to generate a roadmap image based on a plurality of bi-plane and/or 3D ultrasound images. The roadmap generation system 25 may be configured to receive various inputs from the system, including inputs from the interface device 20, ultrasound imaging data from the ultrasound probe 10, the system beamformer 22, and/or the signal and image processor 24.

FIG. 2A shows a biplane ultrasound image 200 of tissue surrounding a blood vessel 230, in accordance with aspects of the present disclosure. The image includes a longitudinal plane 210 and a cross-sectional plane 220. Depending on the implementation, a biplane image may be captured by a bi-plane ultrasound imaging sensor, by a 2D array ultrasound sensor in bi-plane imaging mode, or by a linear (1D) sensor rotated manually to capture two separate images in two different imaging planes (e.g., orthogonal or approximately orthogonal to one another).

By combining multiple bi-plane images 200, a composite longitudinal image 210 may be stitched together from the individual longitudinal images, or from a 2D cross section of a 3D model constructed from the individual bi-plane images.

FIG. 2B shows the cross-sectional plane 220 of the bi-plane image of FIG. 2A. Visible in the image is the blood vessel 230. Because the vessel 230 appears in two orthogonal planes, different types of movements can be detected using both planes. For example, longitudinal displacement may be seen as a change in the cross-sectional image, whereas lateral movement can be seen as a change in the longitudinal image, while diagonal movement can be observed as a change in both images. In some embodiments, the planes of the bi-plane image are orthogonal to each other. In other embodiments, the two planes may intersect at an acute or oblique angle.

Figure 3B:
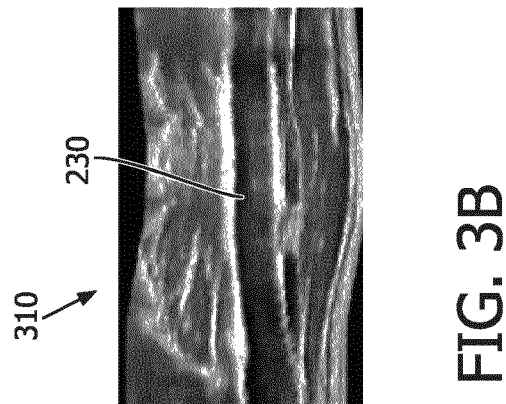
FIG. 3B shows a 2D longitudinal view extracted from the 3D image of FIG. 3A, according to aspects of the present disclosure.
Figure 3A:
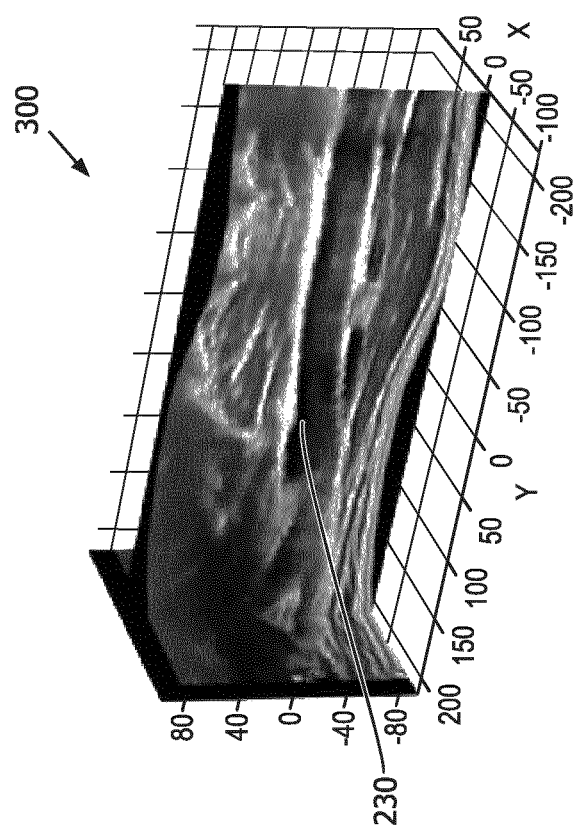
FIG. 3A shows a 3D ultrasound image that includes a blood vessel, according to aspects of the present disclosure.

FIG. 3A shows a 3D ultrasound image 300 that includes a blood vessel 230. The volumetric image may be captured by a 3D ultrasound imaging system which has a matrix of ultrasound sensors, or a device to electrically or mechanically steer a 2D array of sensors to create 3D image. By combining multiple 3D images, the ultrasound roadmap generation system can stitch together a composite 3D roadmap from the individual 3D frames.

FIG. 3B shows a 2D longitudinal view 310 extracted from the 3D roadmap 300 of FIG. 3A (e.g., as a longitudinal cross section of the 3D image). When multiple 3D images are stitched together to create a composite 3D roadmap 300, the ultrasound roadmap generation system can extract a composite longitudinal view 310, e.g., by taking a longitudinal cross-section of the composite 3D image 300. Multiple 3D roadmaps 300 may be registered to one another and combined together to generate a larger, composite 3D roadmap 300. A composite 2D longitudinal view 310 may then be extracted from the larger composite 3D roadmap 300.

FIG. 4A and FIG. 4B show two different composite longitudinal views 400 of the tissue surrounding two different blood vessels 230, 231. The composite longitudinal views 400, 401 have each been stitched together from a plurality of single image frames 410, 411 (whether bi-plane or 3D image frames), and are suitable for use as roadmap images by a clinician or other user. In that regard, each composite longitudinal view 400 includes annotations 420, 421 that have been added by a clinician or other user in order to highlight certain dimensions or other features of the images. Such roadmap images, whether annotated or not, may be employed by clinicians and other users in clinical decision making, without reviewing multiple image frames 410 or 411 of different regions of the tissue, or to mentally visualize features outside the field of view of an individual image frame 410 or 411.

The clinical value of panoramic ultrasound roadmapping is substantial. For example, the extended field-of-view can allow clinicians to make more accurate measurements, such as sizing long vessels and devices. The present disclosure advantageously enables the creation of extended-field-of-view anatomy maps with ultrasound. In some embodiments, the roadmaps may be comparable in resolution, accuracy, and readability/interpretability to current modalities such as X-ray angiography, CT, and MRI. The extended field of view can enable a number of important secondary uses, including but not limited to the ability to make more accurate measurements, such as sizing long vessels and devices in peripheral vascular disease (PVD), tracking IVUS position within the body, measuring TEE intubation distance, etc. Typically, ultrasound only gives a small window of anatomical information with which to perform multimodality fusion and registration. Improving the accuracy of image-based fusion, such that it is comparable to other imaging modalities (e.g. X-ray/CT/MRI), permits the creation of accurate roadmaps that increase anatomical context as shown in FIGS. 4A and 4B, and thereby can improve registration fidelity. This may also enable the creation of ultrasound-based anatomical atlases, e.g. to examine anatomical variability across patients.

Figure 5:
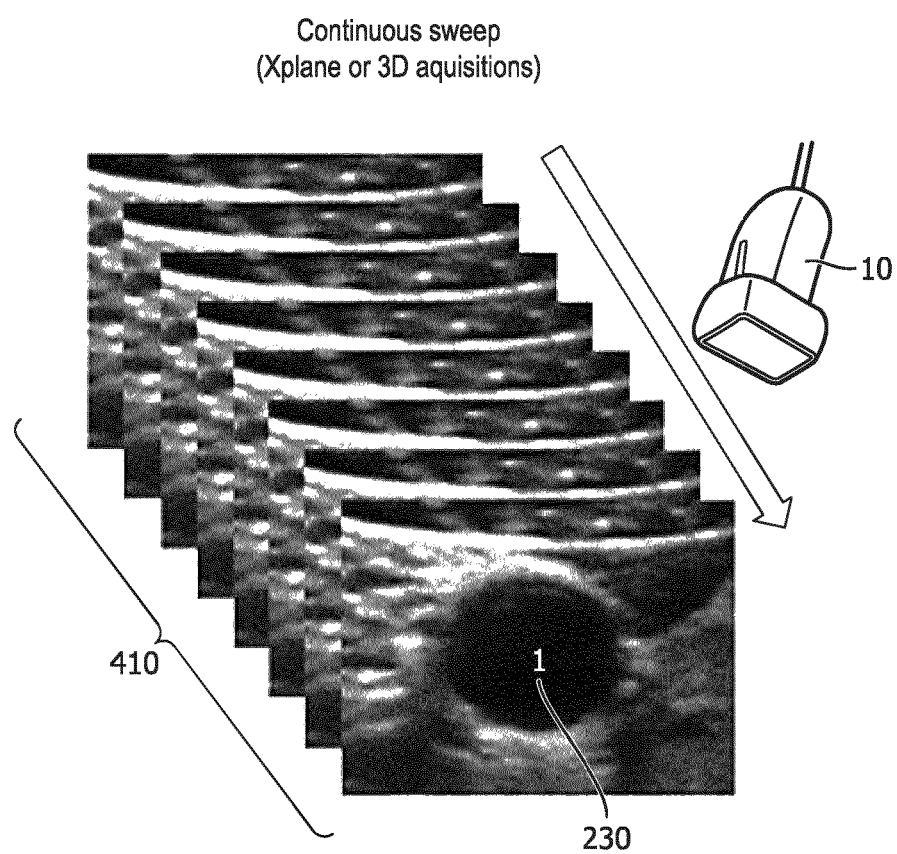
FIG. 5 is a diagrammatic view of an ultrasound probe obtaining a plurality of individual image frames during a continuous sweep of the probe across the patient's anatomy, according to aspects of the present disclosure.

FIG. 5 shows an ultrasound probe 10 gathering a plurality of individual image frames 410 during a continuous sweep of the probe 10 across the patient's anatomy. In this modality, ultrasound frames 410 (e.g., bi-plane or 3D image frames) are acquired in succession, and registrations are performed to calculate the relative pose transformations between frames. The transformations are converted from image space to physical space to arrive at the relative probe motion between each pair of successive frames. Finally, the transforms are "stacked" together (composed) to obtain the overall probe motion, from which the full 3D roadmap can be reconstructed. It is noted that transformations relating one image to another may include not only rotation or translation, but also other changes including but not limited to magnification, distortion, or changes in brightness or color pallet. It is noted that accuracy of the roadmap is dependent on the particular software algorithms used for frame-to-frame registration. An exemplary method may apply intensity-based or feature-based rigid registration algorithms to find optimal frame-to-frame alignment.

Image acquisition can proceed according to several different workflows. FIG. 5 depicts either continuous acquisition based on bi-plane imaging, or continuous acquisition based on 3D imaging. However, it should be understood that images may also be acquired through an incremental (stepwise) acquisition workflow based on 3D imaging, or hybrid image acquisition modes that use bi-plane and 3D in combination, interleaved bi-plane and 3D acquisitions, simultaneous bi-plane and 3D acquisitions, and also multi-bi-plane acquisitions.

In some embodiments, position sensors and/or orientation sensors exist in the ultrasound probe 10, and each image has associated with it a transformation matrix that encodes the relative or absolute position and/or orientation of the ultrasound probe 10 at the time the image was captured, and an initial coarse geometric stitching step involves simply constructing a 3D model containing each component image 410 at a location matching its known 3D position and/or orientation, and each new individual image 410 added to the 3D model may simply overwrite co-located portions of earlier-added images 410. A roadmap image 400 (e.g., a 2D longitudinal roadmap image as shown for example in FIG. 4) may then be extracted from the 3D model (e.g., by taking a longitudinal cross-section of the 3D model).

In some embodiments, instead of or in addition to the geometric stitching step, a finer image stitching step is executed using image recognition and image stitching techniques. Such algorithms may rely on recognition and matching of anatomical landmarks (e.g., branches or intersections in a blood vessel 230) from one image to the next. These landmark locations can be used to register and align the multiple images into a single image or coordinate system. Algorithms for stitching together multiple images include the random sample consensus method (RANSAC), and may include, for example, the steps of keypoint or landmark detection, keypoint or landmark registration, image calibration, image alignment, compositing, motion compensation, de-ghosting, color blending, and seam line elimination. Such algorithms can be run in near-real time, and may be capable of running in real time, subject to hardware limitations. In some embodiments, geometric stitching is used exclusively, without an additional image stitching step. In other embodiments, image stitching is used exclusively, without a previous geometric stitching step. In still other embodiments, both geometric stitching and image stitching may be used. However, in each of these cases, the positions of each pixel in the roadmap image 400 are known, and can be expressed for example in a patient-centric or table-centric coordinate system.

In some embodiments, instead of stitching the grayscale or color pixels of the image acquired by the ultrasound system, the data extracted from the image are stitched to present 3D image presentation of the roadmap. Algorithms for data extraction from images include object segmentation, image compression, image to point cloud conversion, object detection, and object tracking. In some embodiments, the vessel contours may be segmented from the ultrasound image, and stitched up to create a 3D vessel mesh representation from the roadmap generation system.

Alternatively, the data extraction may be applied to the reconstructed 3D roadmap itself. As before, algorithms for data extraction from 3D roadmaps include object segmentation, image compression, image to point cloud conversion, object detection, and object tracking. For example, the vessel contours may be segmented from the 3D roadmap and displayed to the user.

In an example, from a plurality of bi-plane or 3D frames 410 captured by the ultrasound imaging system 100, a smaller number of frames 410 are selected for stitching. The number of selected frames may be two, three, four, five, or more frames. In an example, the selected frames 410 have enough overlap for the landmark identification algorithm to be able to match any given landmark between at least two images. If there is enough overlap to register landmarks between images, but overlap is otherwise minimized, then this decreases the number of images to be stitched, in order to cover the full length of the anatomical region of interest, and therefore decreases the time, memory, and computation power used to perform the algorithm. Minimizing overlap also increases the amount of additional information added to the 3D model by each frame, and therefore to the roadmap image 400 extracted from the 3D model. In an example, the roadmap image is extracted as image data located along a single 2D cross-sectional plane (e.g., a longitudinal plane) within the 3D model.

In the example shown in FIG. 5, bi-plane or 3D images are acquired continuously as the user sweeps the transducer over the anatomical area of interest. For the continuous acquisition workflow based on bi-plane imaging, an advantage is that bi-plane images can be acquired using matrix transducers at high frame rates (20-40 Hz) and high image resolutions relative to 3D imaging. As the transducer is moved, the longitudinal image data and short axis image data can both be used to compute frame-to-frame registrations, which in turn allow the probe movement to be back-calculated. For example, probe motions along the primary direction of motion can first be estimated by determining the motion in the long-axis images (i.e. the "in-plane" motion with respect to the longitudinal images). The "out-of-plane" motion can be determined in a second step from the short-axis image data. Alternatively, the motions can be calculated in the inverse order, with "out-of-plane" motions first computed from the short-axis and "in-plane" motion from the long-axis determined last. Some embodiments combine the image-based approaches with tracking sensors, e.g. inertial measurement sensors, that may provide magnitudes and directions of these motions with or without additional calculation.

For embodiments that employ a continuous acquisition workflow based on 3D imaging, the panoramic roadmap can be created from 3D volumes instead of bi-plane images. One advantage of this approach is that out-of-plane translations and rotations are no longer an issue, since the images are volumetric and inherently contain spatial information that can be used to deduce differences in position or orientation from one image to the next. Thus, full 6 degree-of-freedom (DOF) transformations can be computed from one 3D frame to the next with little or no ambiguity. However, with this approach, frame rates and/or image resolution may be lower compared to bi-plane approaches.

In some embodiments, the parameters of the 3D acquisitions are optimized to minimize the above disadvantages. For example, some embodiments may not use the full 3D volume acquirable by the imaging array for registration. Instead, the algorithm may acquire pseudo-3D "thick slices" or "bread slices", e.g., 2D images with just enough 3D depth and volumetric information to allow full 6 DOF registration, while limiting the amount of data used for each image, and thus maintaining similar frame rates and resolutions as bi-plane imaging.

Figure 6:
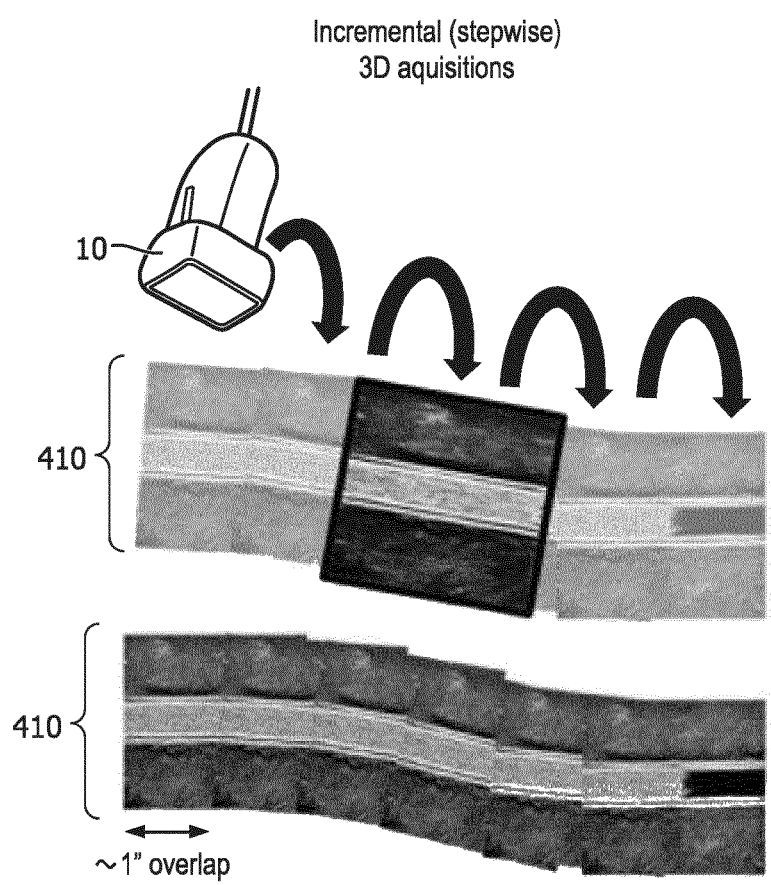
FIG. 6 is a diagrammatic view of an ultrasound probe obtaining a plurality of individual image frames during an incremental or stepwise sweep of the probe across the patient's anatomy, according to aspects of the present disclosure.

FIG. 6 shows an ultrasound probe 10 gathering a plurality of individual image frames 410 during an incremental or stepwise sweep of the probe 10 across the patient's anatomy. With this incremental (step-wise) acquisition workflow based on 3D imaging, instead of acquiring 3D volumes continuously, the system or method stitches volumes together in an incremental or stepwise manner. Here, the workflow for the user is slightly altered; rather than a continuous sweep over the anatomy, the user places the probe at the beginning, acquires a 3D image, moves the probe a distance to another acquisition location (for example, a distance equal to approximately half the 3D imaging field), acquires a second 3D image, and repeat until the user reaches the end of the anatomical region of interest. One advantage of this approach is that image resolution can be increased. However, it is possible that the workflow may be slightly more challenging for the clinician or other user, who must ensure enough overlap between successive 3D acquisitions to allow for accurate registration.

Figure 7:
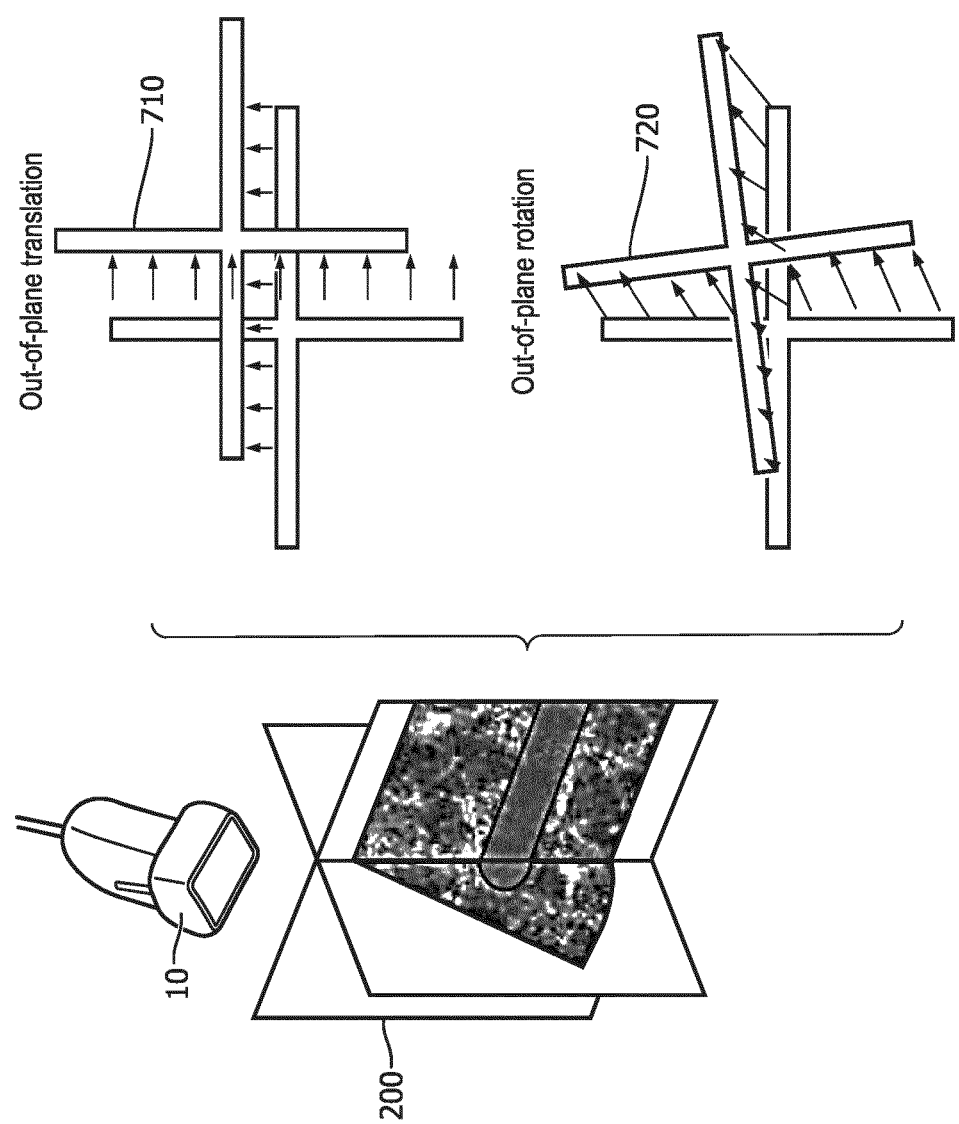
FIG. 7 is a diagrammatic representation of probe motions occurring in a bi-plane image registration procedure, according to aspects of the present disclosure.

FIG. 7 is a diagrammatic representation of challenging probe motions for bi-plane based image registration. When the ultrasound probe 10 is swept continuously or incrementally across the patient's anatomy while acquiring bi-plane images 200, some probe movements create additional challenges for the registration process. Desired translational motion for the ultrasound probe 10 during an imaging sweep is typically along the direction of the long-axis (longitudinal) image plane. With out-of-plane translational motion 710, the probe 10 is moved in a direction that is diagonal to both the long-axis (longitudinal) and short-axis (cross-sectional) image planes, e.g., any direction that is not parallel to either plane. With out-of-plane rotational motion, the orientation or clock angle around the vertical axis of the probe 10 is rotated (e.g., accidentally) to a different orientation with respect to the patient's body, such that the long- and short-axis image planes of a given bi-plane image are not parallel to the long- and short-axis image planes of the previously captured bi-plane image. When the sweep of the probe is performed manually by a clinician or other user, some degree of out-of-plane translation 710 and out-of-plane rotation 720 will normally occur.

Out-of-plane translation 710 becomes problematic when significant out-of-plane motion occurs in both axes, such that the alignment of the image produces distortions in both image planes. Some embodiments of the present disclosure estimate the out-of-plane motion in each plane using speckle-based decorrelation, which is a challenging open research question for 2D ultrasound imaging, but significantly easier with bi-plane images.

Another difficult situation is rotations 720 about the probe axis, where again there is substantial "out-of-plane" motion in both axes. Some embodiments of the present disclosure estimate the out-of-plane motion in each plane using speckle-based decorrelation. Other embodiments use small image subregions, instead of the full images, to estimate out-of-plane rotations, thus reducing the amount of computation involved. Still other embodiments automatically learn out-of-plane decorrelation for different tissues from training data by means of deep learning algorithms or other learning artificial intelligence. Image stitching is discussed for example in U.S. Application No. 62/931,693, titled "CO-REGISTRATION OF INTRAVASCULAR DATA AND MULTI-SEGMENT VASCULATURE, AND ASSOCIATED DEVICES, SYSTEMS, AND METHODS," filed Nov. 6, 2019, the entirety of which is hereby incorporated by reference.

Still other embodiments involve separately estimating the in-plane and out-of-plane motions while applying known constraints. Particularly, since the two image planes are perpendicular with respect to one another, any out-of-plane motion in the long-axis should be identical to the in-plane motion in the short-axis, and vice versa. Applying this constraint to the motion estimation can be used to reduce error for out-of-plane motion estimates. Some embodiments do not simply detect out-of-plane translation or rotation, but also attempt to correct for them. Based on frame-to-frame decorrelation after in-plane motion correction, or based on a ratio of displacement in long axis versus short axis of bi-plane images, the system can adaptively steer the rotational orientation of the imaging planes relative to the probe, in real time, such that the longitudinal plane more closely aligns with the direction of probe translation, rather than the orientation of the probe itself.

Figure 8:
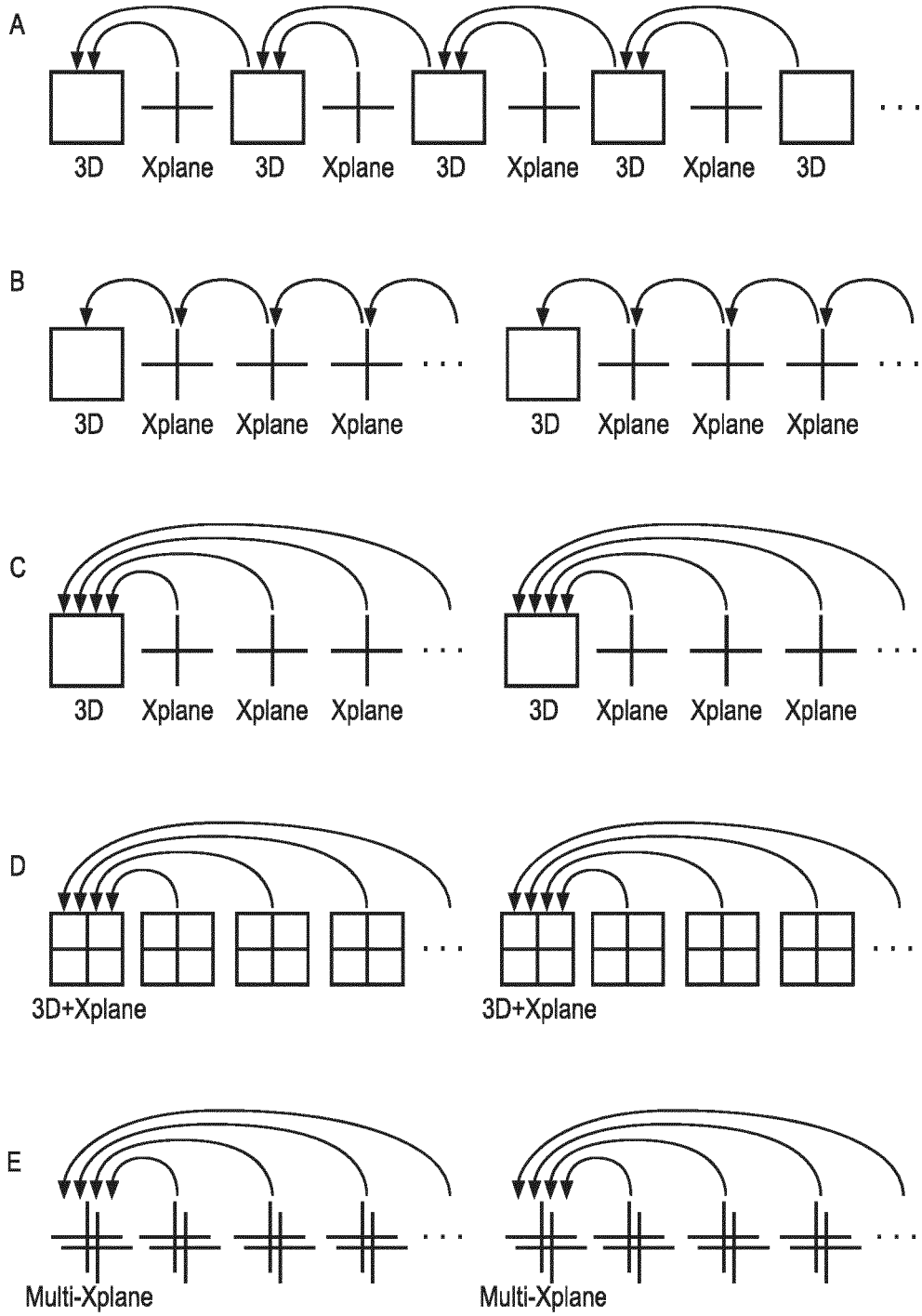
FIG. 8 depicts a variety of different hybrid imaging workflows that can be employed to improve the accuracy and resolution of roadmap images, according to aspects of the present disclosure.

FIG. 8 depicts a variety of different hybrid imaging workflows (A-E) that can be employed to improve the accuracy and resolution of roadmap images. It is possible to combine bi-plane and 3D imaging in novel ways to maximize registration accuracy, by using the 3D images for coarse 6-DOF registration and the bi-plane images for fine in-plane correction as well as actual imaging detail. The modes can be combined by interleaving bi-plane and 3D, or by acquiring images in both modes simultaneously.

Workflow A shows interleaved or alternating bi-plane and 3D image acquisitions. Here, the transducer alternates between bi-plane and 3D, either under manual control or on a set schedule during translation of the probe. The pattern of alternation between bi-plane and 3D imaging can be adjusted, and represents a tradeoff between frame rate, image resolution, processing power requirements, and roadmapping accuracy.

For example, a pattern such as a simple alternation between 3D and bi-plane imaging will result in high roadmap accuracy, since 3D volumes are acquired frequently. However, the imaging frame rate is reduced, since the 3D volumes take up more time and yet are not used to generate the actual anatomical images within the roadmap. Each bi-plane is registered to the most recent 3D volume, and each 3D volume is registered to the 3D volume immediately preceding it.

A repeating pattern that includes one 3D image followed by three bi-plane images. will allow faster update of the image information at a cost of less frequent 3D information for roadmap construction. It may be desirable that the image resolution of the 3D volume does not exceed the resolution sufficient for accurate roadmapping, as increased spatial resolution may lead to reduced temporal resolution.

Workflow B shows bi-plane and 3D images being alternated on an adaptive schedule rather than a fixed schedule. Rather than setting a fixed pattern, the interleaving is varied such that 3D volumes are only acquired when the probe has been estimated to move ~⅓ or ~½ of the probe volume. This way, the minimum number of volumes are acquired to achieve accurate registration. Roadmap construction is based on bi-plane-to-bi-plane registration, with intermittent 3D acquisitions/registrations to prevent loss of accuracy.

Workflow C shows yet another embodiment, in which per-frame motions are calculated from bi-plane-to-3D registrations. Each time a 3D volume is acquired, all subsequent bi-plane acquisitions are down-sampled to a similar resolution as the 3D volume, and then registered to the volume. This allows full 6-DOF registration from frame to frame without having to wait for the next 3D volume. When the new 3D volume is acquired, an additional 3D-3D registration step may be performed to update the roadmap. Thus, rodmap construction is based on a series of bi-plane-to-3D registrations. This is similar to the embodiment shown in Workflow A, except that multiple bi-planes are acquired per 3D volume, in order to speed up the frame rate.

Workflow D depicts simultaneous bi-plane and 3D acquisitions. Rather than interleaving bi-plane and 3D acquisitions, special imaging modes may be introduced to obtain both types of images simultaneously. In one instance, a sparse (low-resolution) 3D volume is acquired along with the bi-plane image, simultaneously. The sparse 3D is used for frame-to-frame registration, while the bi-plane is used for image reconstruction.

Workflow E depicts multi-bi-plane acquisitions. In this embodiment, rather than combining bi-plane and 3D images, multiple bi-planes could be fired simultaneously or in rapid succession (i.e. significantly faster than the probe motion) to provide volume information used for registration and image formation.

For each of the above embodiments, multiple passes over the area may be performed, and the resulting images from each pass may be combined (e.g. via weighted averaging or joint optimization) to produce higher-accuracy roadmaps than would be possible with only one pass.

Similarly, it is possible to perform a pass with one method of acquisition (or combination of methods) and then a subsequent pass or passes with a different method (or combination of methods). In other examples, rather than interleaving, simultaneously acquiring, or otherwise combining bi-plane acquisitions with 3D acquisitions, it is also possible to combine 2D and 3D acquisitions a similar or identical manner. For instance, in FIG. 8, each instance of a bi-plane acquisition could be replaced with a 2D acquisition to achieve a similar effect on roadmap creation. The advantage of using a 2D acquisition is that it can allow an increase in frame rate or line density (image resolution) compared to bi-plane. The disadvantage is that the registration of 2D frames to 3D volumes is likely to be less accurate than bi-plane to 3D registration. Other workflows are contemplated, including but not limited to combinations of the above.

Figure 9:
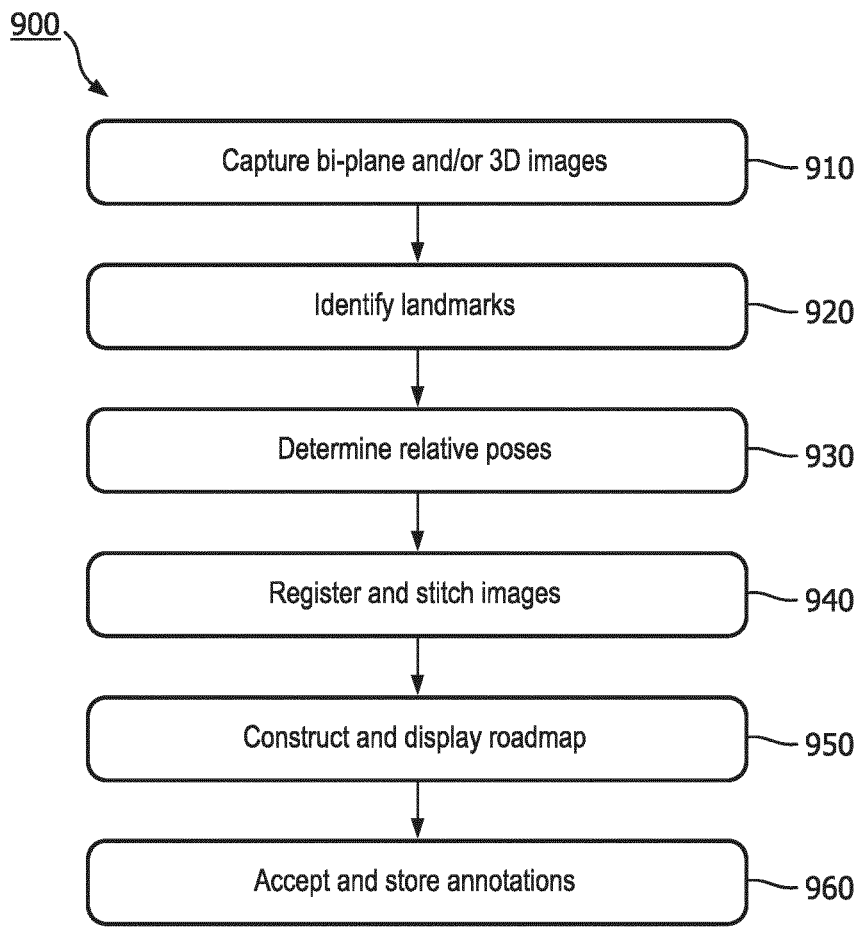
FIG. 9 shows a flow diagram of an example ultrasound roadmap generation method, according to aspects of the present disclosure.

FIG. 9 shows a flow diagram of an example ultrasound roadmap generation method 900 in accordance with at least one embodiment of the present disclosure. It is understood that the steps of method 900 may be performed in a different order than shown in FIG. 9, or additional steps can be provided before, during, and after the steps, and/or some of the steps described can be replaced or eliminated in other embodiments. Steps may be subdivided into sub-steps, which may also be performed in different orders. One or more of steps of the method 900 can be carried by one or more devices and/or systems described herein, such as components of the imaging system 100 of FIG. 1 and/or the processor circuit 1050 of FIG. 10.

In step 910, the method 900 includes capturing two or more bi-plane and/or 3D images, as described for example in FIGS. 5-8. The captured image data set may include various combinations of bi-plane and 3D images, selected to provide both adequate 3D registration information and adequate detail and resolution for the resulting roadmap image, within the speed, memory, and bandwidth constraints of the processor performing the method. Each image may be representative of a slightly different volume of tissue within the patient, as the imaging probe moves between the capturing of one image and the capturing of the next.

In step 920, the method identifies common landmarks or keypoints between images. Such anatomical landmarks may include for example branches or intersections in a blood vessel as they change position from one image to the next. Alternatively, the common landmarks may be the raw intensities of the image pixels themselves. A combination of landmarks, keypoints, and raw image intensities may also be used.

In step 930, the method uses the common landmarks to determine the relative poses of the images. This can be done for example by using the 3D locations of a landmark in two different images, and computing the translations and rotations involved to produce the observed changes in location from one image to the next. This can be done with a single landmark, but 3D accuracy is greatly improved if two or more landmarks are used.

In step 940, the method registers the images, e.g., by rotating and/or translating them into a common coordinate system, thus creating a 3D model of the region of anatomical interest that incorporates image data from the two or more bi-plane and/or 3D images. This can be done, for example, using the RANSAC method as described above. If the raw image intensities are used as common landmarks, image-based registration techniques may be used that are known in the art.

In step 950, the method constructs a roadmap image, e.g., by taking a suitable longitudinal cross-section of the 3D model that shows the desired anatomical features of the anatomical region of interest. The roadmap may then be displayed (e.g., on the display 30 of FIG. 1) or stored (e.g., in the memory 1064 of FIG. 10).

In step 960, the method accepts user inputs via the user interface that have the effect of placing textual or graphical annotations onto the roadmap image, to aid in reporting, clinical decision making, record keeping, etc. Examples of such annotations can be seen for example in FIGS. 4A and 4B.

FIG. 10 is a schematic diagram of a processor circuit 1050, according to embodiments of the present disclosure. The processor circuit 1050 may be implemented in the ultrasound imaging system 100 of FIG. 1, or other devices or workstations (e.g., third-party workstations, network routers, etc.), or on a cloud processor or other remote processing unit, as necessary to implement the method. As shown, the processor circuit 1050 may include a processor 1060, a memory 1064, and a communication module 1068. These elements may be in direct or indirect communication with each other, for example via one or more buses.

The processor 1060 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 1060 may also comprise another hardware device, a firmware device, or any combination thereof configured to perform the operations described herein. The processor 1060 may also be implemented as a combination of computing devices, e.g., a combination of a DSP and a microprocessor, a plurality of microprocessors, one or more microprocessors in conjunction with a DSP core, or any other such configuration.

The memory 1064 may include a cache memory (e.g., a cache memory of the processor 1060), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 1064 includes a non-transitory computer-readable medium. The memory 1064 may store instructions 1066. The instructions 1066 may include instructions that, when executed by the processor 1060, cause the processor 1060 to perform the operations described herein. Instructions 1066 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The communication module 1068 can include any electronic circuitry and/or logic circuitry to facilitate direct or indirect communication of data between the processor circuit 1050, and other processors or devices. In that regard, the communication module 1068 can be an input/output (I/O) device. In some instances, the communication module 1068 facilitates direct or indirect communication between various elements of the processor circuit 1050 and/or the ultrasound imaging system 100 of FIG. 1. The communication module 968 may communicate within the processor circuit 950 through numerous methods or protocols. Serial communication protocols may include but are not limited to US SPI, I$^2$C, RS-232, RS-485, CAN, Ethernet, ARINC 429, MODBUS, MIL-STD-1553, or any other suitable method or protocol. Parallel protocols include but are not limited to ISA, ATA, SCSI, PCI, IEEE-488, IEEE-1284, and other suitable protocols. Where appropriate, serial and parallel communications may be bridged by a UART, USART, or other appropriate subsystem.

External communication (including but not limited to software updates, firmware updates, or readings from the ultrasound device) may be accomplished using any suitable wireless or wired communication technology, such as a cable interface such as a USB, micro USB, Lightning, or FireWire interface, Bluetooth, Wi-Fi, ZigBee, Li-Fi, or cellular data connections such as 2G/GSM, 3G/UMTS, 4G/LTE/WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

Figure 11B:
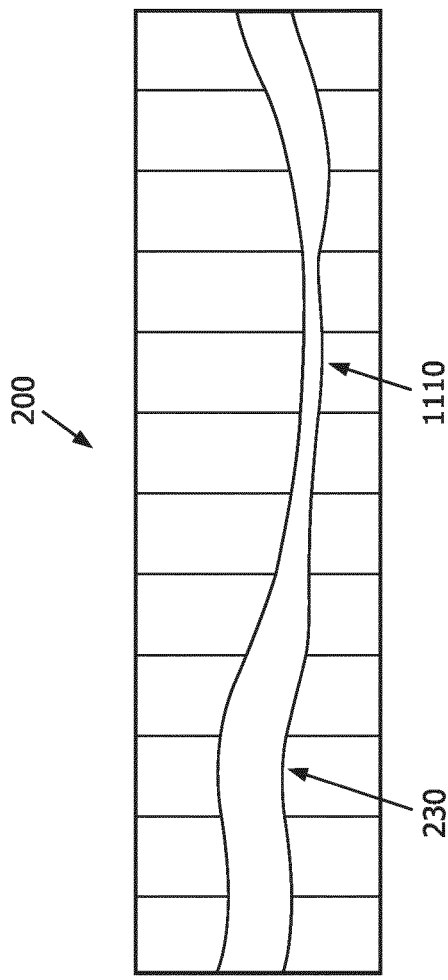
FIG. 11B shows a flattened longitudinal image derived from the curved longitudinal image of FIG. 11A, in accordance with at least one embodiment of the present disclosure.
Figure 11A:
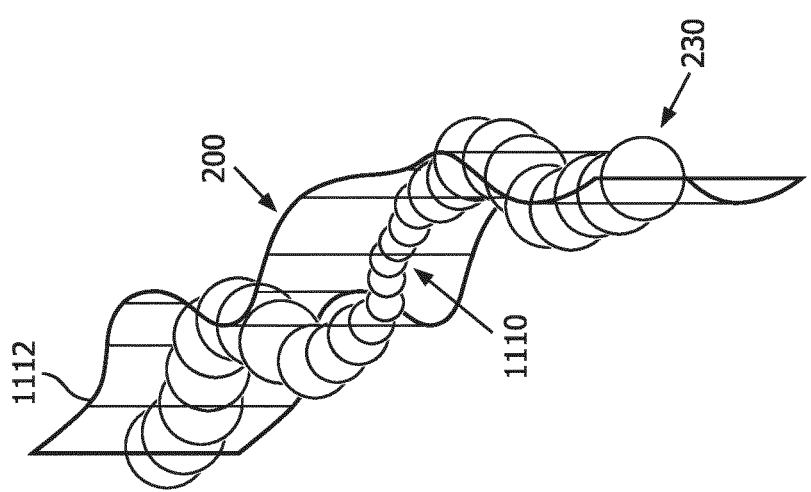
FIG. 11A is a diagrammatic view of a vessel including a stenosis, being imaged with a longitudinal scan, in accordance with at least one embodiment of the present disclosure.

FIG. 11A is a perspective, diagrammatic view of a vessel 230 including a stenosis 1110, being imaged with a longitudinal scan 200, in accordance with at least one embodiment of the present disclosure. Data extraction, whether from the individually captured images or from the roadmap, may be further used to provide additional information and visualizations. In the example shown in FIG. 11A, the contours of a vessel 230 that are segmented from the roadmap are then used to generate a curved longitudinal slice through the roadmap which follows the trajectory 1112 (e.g., the centerline) of the vessel. In comparison to the straight longitudinal slice such as shown in FIGS. 3A and 3B, the curved slice shown in FIG. 11A may increase the likelihood that the vessel is shown in each frame, even when the vessel is curved or tortuous. The curved slices through the roadmap may then be displayed on the screen as a flattened image.

FIG. 11B shows a flattened longitudinal image 200 derived from the curved longitudinal image 200 taken along the trajectory 1112 of FIG. 11A, in accordance with at least one embodiment of the present disclosure. Visible are the vessel 230 and stenosis 1110. Although FIG. 11A shows the vertical axis of the curved longitudinal slice to be along the axial direction (i.e. aligned with the ultrasound imaging beams), in some embodiments, the vertical axis of the curved longitudinal slice could, for example, be orthogonal to the longitudinal slice shown in FIG. 3A. In some embodiments, multiple curved slices are extracted to be displayed simultaneously side by side (for example one axial-longitudinal and one elevational-longitudinal). These multiple curved slices could help to better assess plaque burden along length and roundness of the vessel lumen along its length.

Methods for accumulating a plurality of individual pairwise (frame-to-frame) registrations into a single stitched roadmap may be applied. For example, a technique for accumulating a plurality of individual pairwise registrations into a single stitched roadmap may include optimizing of the plurality of pairwise registrations to enforce global constraints on the reconstructed roadmap. These constraints include consistency across multiple sets of overlapping images or volumes. For instance, in a continuous sweep, the added rotation and translation estimated by registering a first frame to a second frame, and then the second frame to a third frame, should be consistent with the rotation and translation estimated by directly registering the first frame to the third frame (assuming there is overlap). Methods such as Bundle Adjustment, Simultaneous Localization and Mapping (SLAM), Kalman Estimation, and other global optimization techniques, may be applied to address the multiple frame stitching problem.

Other prior constraints, such as the known dimensions or length of the anatomy being roadmapped, or information from secondary sensors or imaging, may be used to further improve the accuracy of the final roadmap reconstruction. Similarly, if structures within the image frames, such as the vessels of interest, are segmented during or after the roadmap sweep, this information may be used to optimize the roadmap.

Figure 12:
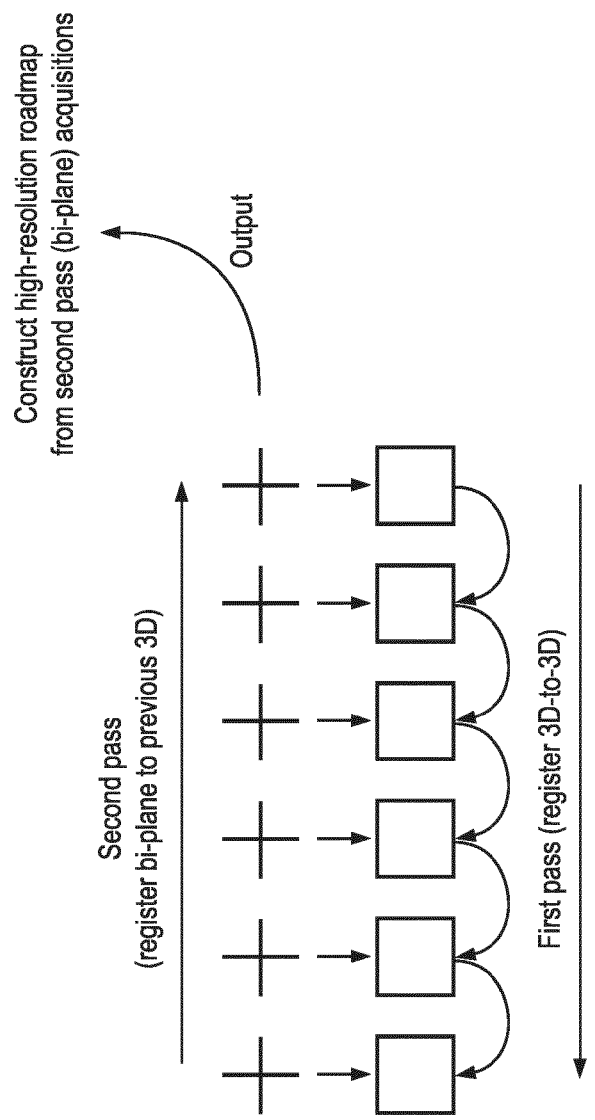
FIG. 12 is a diagrammatic representation of an example two-pass imaging technique for roadmap generation, in accordance with at least one embodiment of the present disclosure.

FIG. 12 is a diagrammatic representation of an example two-pass imaging technique for roadmap generation, in accordance with at least one embodiment of the present disclosure. As illustrated in FIG. 12, a roadmap may be constructed from multiple passes. Furthermore, intermediate roadmaps constructed from each pass may be registered with one another to create a full extended roadmap or to resolve inaccuracies from any one roadmap alone. In the example shown in FIG. 12, a first pass in a first direction gathers and registers a series of 3D images, and then a second pass in the opposite direction gathers a series of bi-plane images, each of which can then be registered to the nearest 3D image.

If multiple passes or sweeps are carried out, these may be performed with different acquisition workflows (e.g. continuous followed by incremental, or vice versa) or with different acquisition modes (e.g. 3D followed by bi-plane, or vice versa). For instance, as depicted in FIG. 12, a first pass could be carried out with 3D acquisitions at a lower resolution and frame rate, and a second pass carried out with bi-plane at a higher resolution and frame rate. By registering each bi-plane acquisition to the 3D acquisitions acquired in the first pass, a final roadmap of high resolution can be produced, with the geometrical accuracy afforded through the 3D volume acquisitions.

In the present disclosure, an ultrasound transducer is swept over an extended area of anatomy to create an extended, panoramic roadmap image. Typically, a matrix probe is used as opposed to a standard 2D probe, and bi-plane and/or 3D, or combinations thereof, are the primary modes of imaging during the sweep. Out-of-plane probe motions from the user are automatically accounted for in a way that is not possible with existing methods based on standard 2D image-based registration. The ultrasound roadmap generation system may be applied to any ultrasound imaging system, including external ultrasound, intracatheter or intravascular ultrasound, and transesophageal echo. The ultrasound roadmap generation system has the potential to greatly improve the accuracy of the roadmapping technology, and be an important new feature on future ultrasound platforms, particularly (though not exclusively) ones that support matrix transducer technology.

A number of variations are possible on the examples and embodiments described above. For example, specialized ultrasound probes, beamformers, or processor circuits may be developed that are optimized to work with the ultrasound roadmap generation system. The technology described herein may be applied to fields other than human medicine, including veterinary medicine, materials inspection, and manufacturing. The logical operations making up the embodiments of the technology described herein are referred to variously as operations, steps, objects, elements, components, or modules. It should be understood that these may occur, be performed, or be arranged in any order, unless explicitly claimed otherwise or a specific order is inherently necessitated by the claim language.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the ultrasound roadmap generation system. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the ultrasound roadmap generation system as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A system for generating a two dimensional (2D) roadmap image, comprising:
    a processor circuit configured for communication with an ultrasound imaging device movable relative to a patient, wherein the processor circuit is configured to:
    receive a first bi-plane or three dimensional (3D) image representative of a first volume within the patient and a second bi-plane or 3D image representative of a second volume within the patient;
    register the first bi-plane or 3D image and the second bi-plane or 3D image to determine a first motion between the first bi-plane or 3D image and the second bi-plane or 3D image;
    receive a third bi-plane or 3D image representative of a third volume within the patient;
    register the third bi-plane or 3D image to at least one of the first bi-plane or 3D image or the second bi-plane or 3D image to determine a second motion between the third bi-plane or 3D image and the at least one of the first bi-plane or 3D image or the second bi-plane or 3D image;
    generate a 2D roadmap image of a region of interest by combining the first, second, and third bi-plane or 3D images, based on the determined first motion and second motion; and
    output, to a display in communication with the processor circuit, a screen display comprising the 2D roadmap image,
    wherein two images of the first, second, and third bi-plane or 3D images are 3D images,
    wherein one image of the first, second, and third bi-plane or 3D images is a bi-plane image, and wherein the processor circuit is further configured to:
    register the two 3D images to each other;
    register the bi-plane image to a nearest 3D image of the two 3D images;
    extract image data from the bi-plane image; and
    generate the 2D roadmap image based on the extracted image data.

2. The system of claim 1, wherein the processor circuit is configured to combine the first bi-plane or 3D image and the second bi-plane or 3D image by transforming the first bi-plane or 3D image relative to the second bi-plane or 3D image such that the first bi-plane or 3D image and the second bi-plane or 3D image are in a same coordinate system.

3. The system of claim 1, wherein the processor circuit is configured to:
    identify an image landmark in each of the first bi-plane or 3D image and the second bi-plane or 3D image; and
    combine the first bi-plane or 3D image and the second bi-plane or 3D image by transforming, based on the determined first motion, at least one of the first bi-plane or 3D image or the second bi-plane or 3D image such that the image landmark in the first bi-plane or 3D image is aligned with the image landmark in the second bi-plane or 3D image.

4. The system of claim 1, wherein the 3D images have lower resolution than the bi-plane images.

5. A method for generating a two dimensional (2D) roadmap image, comprising:
    receiving, at a processor circuit configured for communication with an ultrasound imaging device movable relative to a patient, a first bi-plane or three dimensional (3D) image of a first volume within the patient and a second bi-plane or 3D image of a second, overlapping volume within the patient;
    registering the first bi-plane or 3D image and the second bi-plane or 3D image to determine a first motion between the first bi-plane or 3D image and the second bi-plane or 3D image;
    receiving at a third bi-plane or 3D image representative of a third volume within the patient; registering the third bi-plane or 3d image to at least one of the first bi-plane or 3D image or the second bi-plane or 3D image to determine a second motion between the third bi-plane or 3D image and the at least one of the first bi-plane or 3D image or the second bi-plane or 3D image;

generating, with the processor circuit, a 2D roadmap image of a region of interest by combining the first, second, and third bi-plane or 3D images, based on the determined first motion and second motion; and outputting, to a display in communication with the processor circuit, a screen display comprising the 2D roadmap image, wherein two images of the first, second, and third bi-plane or 3D images are 3D images, wherein one image of the first, second, and third bi-plane or 3D images is a bi-plane image, and wherein the method further comprises:

registering the two 3D images to each other;

registering the bi-plane image to a nearest 3D image of the two 3D images;

extracting image data from the bi-plane image; and generating the 2D roadmap image based on the extracted image data.

6. The method of claim 5, wherein generating the roadmap image includes transforming the first bi-plane or 3D image relative to the second bi-plane or 3D image such that the first bi-plane or 3D image and the second bi-plane or 3D image are in a same coordinate system.

7. The method of claim 5, wherein generating the roadmap image includes:

identifying an image landmark that is common to the first bi-plane or 3D image and the second bi-plane or 3D image; and combining the first bi-plane or 3D image and the second bi-plane or 3D image by transforming, based on the determined first motion, at least one of the first bi-plane or 3D image or the second bi-plane or 3D image such that the image landmark in the first bi-plane or 3D image is aligned with the image landmark in the second bi-plane or 3D image.

8. The method of claim 5, wherein the bi-plane images have higher resolution than the 3D images.

* * * * *